Nov. 24, 1931.  F. H. WOLF  1,833,699

INSECT TRAP

Filed March 16, 1929

Inventor
Frederick H. Wolf
By Adam E. Fisher
Attorney

Patented Nov. 24, 1931

1,833,699

UNITED STATES PATENT OFFICE

FREDERICK H. WOLF, OF MELCHER, IOWA

INSECT TRAP

Application filed March 16, 1929. Serial No. 347,536.

This invention is an insect trap for trapping insects which are attracted by a light.

The main object of the invention is to provide a trap of this kind in an efficient form which is readily portable and so may be used in any place that the insects frequent.

Another object is the provision of such a device in a simple, durable and neat form.

The foregoing and other objects together with means whereby the same may be carried into effect will best be understood from the following description of a preferred embodiment of the invention taken in connection with the accompanying drawings wherein.

Figure 1:
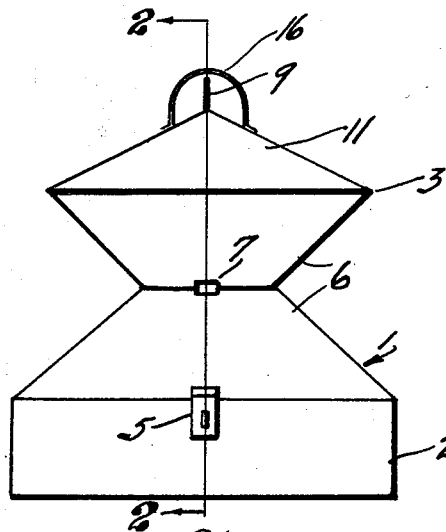
Figure 1 is a side view of the invention.
Figure 2:
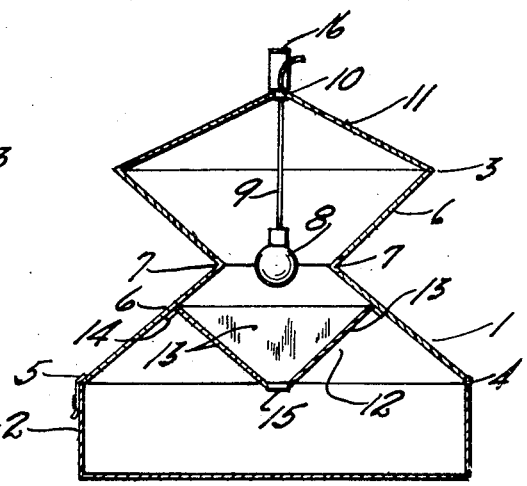
Figure 2 is a section along the line 2—2 in Figure 1.
Figure 3:
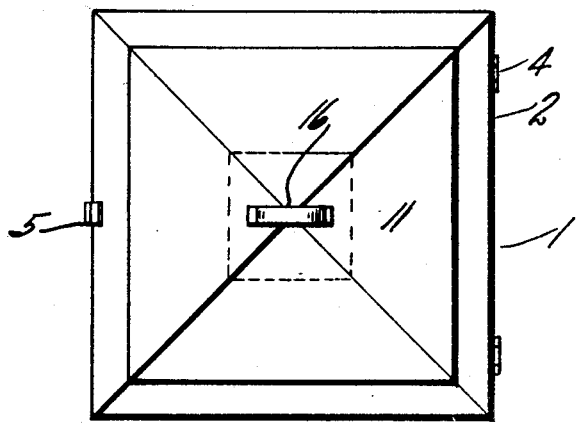
Figure 3 is a plan view.

Referring now more particularly to the drawings the reference numeral 1 denotes a housing of any suitable material comprising a rectangular base 2 and an angularly formed case 3. Preferably the lower margin of the case 3 is hinged at one side to the upper margin of the base 2 at 4 and a spring latch 5 of conventional form serves to normally retain the case closed upon the said base. The case 3 has inwardly directed or inset angularly formed walls 6 as shown and apertures or slots 7 are provided in each of these said walls 6 through which the insects may enter. A light 8 is depended within the case 3 in alignment with these apertures 7 by means of its connecting wires 9 which pass through a bushing 10 seated in the center of the top 11 as shown. This light 8 when turned on serves to attract the insects so that they will enter the case 3 through the aforesaid apertures 7. A trapping funnel 12 is provided in the case 3 below the apertures 7, the same comprising the downwardly converging sides 13 secured at their upper margins to the angular walls 6 as at 14. These sides 13 are preferably formed of glass and terminate short of meeting at their lower ends forming a medially disposed aperture or outlet 15. It will be readily understood that the insects which swarm around the light 8 will tire and drop onto the funnel 12 the sloping sides of which will cause them to fall through the aperture 15 into the base 2. Any desired solution or mixture which will kill the insects may be kept in the base 2. A handle 16 is provided by means of which the trap may be carried from place to place.

While I have herein set forth a certain preferred embodiment of my invention it is understood that I may vary from the same in minor structural details not departing from the spirit of the invention and within the scope of the appended claim.

I claim:

In a device of the kind described, a housing comprising a case having upper and lower inwardly directed walls with apertures leading into the case through the meeting point of the walls and a trapping funnel depending within the case below the said apertures, the same including downwardly converging sides of glass material, there being an aperture at the lowermost point of the converged sides, and a light positioned within the case.

In testimony whereof I affix my signature.

FREDERICK H. WOLF.